(12) United States Patent
Leavesley (10) Patent No.: US 7,644,583 B2
(45) Date of Patent: Jan. 12, 2010

(54) TURBOCHARGER APPARATUS HAVING AN EXHAUST GAS SEALING SYSTEM FOR PREVENTING GAS LEAKAGE FROM THE TURBOCHARGER APPARATUS

(76) Inventor: Malcolm George Leavesley, 54 Heylyn Square, Malmesbury Road, Bow, London E3 2DW (GB)

( * ) Notice: Subject to any disclaimer, the term of this patent is extended or adjusted under 35 U.S.C. 154(b) by 0 days.

(21) Appl. No.: 10/558,053

(22) PCT Filed: Jul. 9, 2004

(86) PCT No.: PCT/GB2004/002976

§ 371 (c)(1),
(2), (4) Date: Nov. 22, 2005

(87) PCT Pub. No.: WO2005/008041

PCT Pub. Date: Jan. 27, 2005

(65) Prior Publication Data

US 2006/0213195 A1 Sep. 28, 2006

(30) Foreign Application Priority Data

Jul. 11, 2003 (GB) .................................. 0316353.2
Oct. 6, 2003 (GB) .................................. 0323356.6

(51) Int. Cl.
*F02D 23/00* (2006.01)
*F02B 37/12* (2006.01)
*F02B 37/18* (2006.01)
*F02B 37/24* (2006.01)
*F01D 9/02* (2006.01)
*F01D 17/12* (2006.01)
*F01D 17/14* (2006.01)
*F01D 17/16* (2006.01)

(52) U.S. Cl. .......................... 60/602; 415/156; 415/160

(58) Field of Classification Search .................... 60/602; 415/156, 160, 166; 277/370, 385, 390, 404; 251/263
See application file for complete search history.

(56) References Cited

U.S. PATENT DOCUMENTS 1,991,434 A * 2/1935 Vaughn ..................... 236/48 R (Continued)

FOREIGN PATENT DOCUMENTS

DE 26 09 635 A1 * 9/1977

(Continued)

OTHER PUBLICATIONS

Translation JP 05248253 A (Takebe, Kaoru) and JP 08334030 A (Harada, Yukihiro).*

(Continued)

*Primary Examiner*—Thai Ba Trieu
(74) *Attorney, Agent, or Firm*—Iandiorio Teska & Coleman (57) ABSTRACT

Turbocharger apparatus (1) comprising a housing (4), a compressor, a turbine (40), a first inlet (39) for enabling air to be conducted to the compressor, an outlet (36) for enabling air from the compressor to be conducted to an engine, a second inlet (53) for enabling exhaust gases from the engine to be conducted to the turbine (40), a chamber (96), a bearing assembly (82) for permitting the rotation of the turbine (40), and a control system (5, 10) for controlling the speed of the turbine (40), the control system (5, 10) having an exhaust gas sealing system (8, 21, 26) which prevents exhaust gas leakage from the turbocharger apparatus (1), and which allows expansion of parts within the exhaust gas sealing system (8, 21, 26) at high temperatures.

6 Claims, 8 Drawing Sheets

U.S. PATENT DOCUMENTS

| | | | | |
|---|---|---|---|---|
| 2,586,739 | A | * | 2/1952 | Summers .................. 277/390 |
| 2,976,013 | A | * | 3/1961 | Hunter ..................... 415/163 |
| 3,542,484 | A | | 11/1970 | Mason ..................... 415/160 |
| 3,604,098 | A | * | 9/1971 | Goldberg .................. 277/370 |
| 3,695,777 | A | * | 10/1972 | Westphal et al. ........... 415/160 |
| 3,972,504 | A | * | 8/1976 | DiSabatino et al. .......... 251/82 |
| 4,245,953 | A | * | 1/1981 | Milton et al. ............... 60/602 |
| 4,343,479 | A | * | 8/1982 | Fukuoka et al. ............. 277/404 |
| 4,363,491 | A | * | 12/1982 | Secor ....................... 277/385 |
| 4,363,600 | A | | 12/1982 | Thebert ..................... 415/156 |
| 4,427,204 | A | * | 1/1984 | Alley ........................ 277/390 |
| 5,148,678 | A | * | 9/1992 | Ueda et al. .................. 60/602 |
| 5,207,559 | A | | 5/1993 | Clevenger et al. ........... 415/166 |
| 6,170,800 | B1 | * | 1/2001 | Meloul et al. .............. 251/149.1 |
| 6,679,476 | B2 | * | 1/2004 | Noyes et al. ................ 251/263 |
| 7,080,510 | B2 | * | 7/2006 | Ishihara et al. ............... 60/602 |

FOREIGN PATENT DOCUMENTS

| | | | |
|---|---|---|---|
| EP | 1820941 A1 | * | 8/2007 |
| FR | 2 743 846 | | 7/1997 |
| FR | 2897639 A1 | * | 8/2007 |
| GB | 820 595 | | 9/1959 |
| JP | 61049104 A | * | 3/1986 |
| JP | 61070105 A | * | 4/1986 |
| JP | 5 248253 | | 9/1993 |
| JP | 8 334030 | | 12/1996 |
| JP | 11 229886 | | 8/1999 |
| JP | 2000193044 A | * | 7/2000 |
| JP | 2002034104 A | * | 1/2002 |
| RU | 2068140 C1 | * | 10/1996 |

OTHER PUBLICATIONS

A Translation Takebe Patent No. JP 05-248253 A.*
A Translation Harada Patent No. JP 08-335030 A.*

* cited by examiner

TURBOCHARGER APPARATUS HAVING AN EXHAUST GAS SEALING SYSTEM FOR PREVENTING GAS LEAKAGE FROM THE TURBOCHARGER APPARATUS

FIELD OF THE INVENTION

This invention relates to turbocharger apparatus and, more especially, this invention relates to turbocharger apparatus having an exhaust gas sealing system for preventing gas leakage from the turbocharger apparatus. By preventing gas leakage from the turbocharger apparatus, all of the exhaust gases from an engine may be treated by the exhaust system after-treatment apparatus, for example by a catalyst system and/or a particulate system.

BACKGROUND OF THE INVENTION

Turbocharger apparatus is known comprising a housing, a compressor mounted for rotation in the housing, a turbine mounted for rotation in the housing, a first inlet for enabling air to be conducted to the compressor, an outlet for enabling air from the compressor to be conducted to an engine, a second inlet for enabling exhaust gases from the engine to be conducted to the turbine in order to rotate the turbine, a chamber which surrounds around the turbine and which receives the exhaust gases from the second inlet before the exhaust gases are conducted to the turbine, a bearing assembly for permitting the rotation of the turbine, and a control system for controlling the speed of the turbine.

One of the problems with such known turbocharger apparatus is that there is exhaust gas leakage from the turbocharger apparatus. This exhaust gas leakage from the turbocharger apparatus causes a problem because the exhaust gases that manage to leak by the turbocharger apparatus have not been treated by the exhaust gas after-treatment apparatus that may be fitted to a vehicle having the turbocharger apparatus.

The problem of gas leakage in a turbocharger is difficult to solve because of the high temperature change under which the turbocharger apparatus has to work. This temperature may exceed 1000° C., so that the control systems that have to work within the turbine housing of the turbocharger apparatus have to be designed to have a working clearance, so that parts do not seize when the turbocharger apparatus is working at the high temperatures. The working clearance allows some exhaust gases to leak by the turbine housing control systems or a control system in the bearing housing assembly.

BRIEF SUMMARY OF THE INVENTION

It is an aim of the present invention to obviate or reduce the above mentioned problems.

Accordingly, the present invention provides turbocharger apparatus comprising a housing, a compressor mounted for rotation in the housing, a turbine mounted for rotation in the housing, a first inlet for enabling air to be conducted to the compressor, an outlet for enabling air from the compressor to be conducted to an engine, a second inlet for enabling exhaust gases from the engine to be conducted to the turbine in order to rotate the turbine, a chamber which surrounds the turbine and which receives the exhaust gases from the second inlet before the exhaust gases are conducted to the turbine, a bearing assembly for permitting the rotation of the turbine, and a control system for controlling the speed of the turbine; the control system comprising a fixed bush which has a first end and a second end, a control rod which is mounted in the bush, a control lever for rotating the control rod backwards and forwards, and an exhaust gas sealing system for preventing exhaust gas leakage from the turbocharger apparatus; the bush comprising a solid cylindrical portion, and a bore which extends through the solid cylindrical portion and which is defined by an inner surface of the solid cylindrical portion, the inner surface being in direct contact with the control rod; and the exhaust gas sealing system being such as to allow expansion of parts within the exhaust gas sealing system when the turbocharger apparatus is working at high temperatures, and the exhaust gas sealing system comprising a disc spring which:

(i) is mounted on the control rod at a position between the first end of the bush and the control lever;

(ii) causes a spring load to be applied to the second end of the bush and thereby exhaust gas sealing at the second end of the bush;

(iii) has an inner concave area which, when the disc spring is put under load, enables exhaust gas sealing at the first end of the bush by preventing exhaust gas leakage past the inner concave area ; and (iv) is held in position on the control rod by abutment means which provides a continuous uninterrupted surface through which the exhaust gases cannot pass under all working conditions of the turbocharger apparatus.

The turbocharger apparatus of the present invention may be for example, variable geometry turbocharger apparatus or waste gated turbocharger apparatus. The high temperatures may be in excess of 1000° C.

The turbocharger sealing system may operate to allow for different expansion rates so to seal gases at the high temperatures.

The turbocharger apparatus may be one in which the control system that controls the speed of the turbocharger has a control rod. This control rod may have the exhaust gas sealing system so to prevent exhaust gas leakage from the turbocharger apparatus. The control rod may exit through the turbine housing or through the bearing housing assembly. The bush may be mounted in a turbine housing part of the turbocharger apparatus. Alternatively, the bush may be mounted in the a bearing housing assembly part of the turbocharger apparatus. The disc spring may adjust for wear within the exhaust gas sealing system.

The turbocharger apparatus may be one in which the disc spring is mounted on the outside of the turbocharger apparatus so as to prevent heat soak to the disc spring.

The turbocharger apparatus may include wear washers for to preventing wear of parts within the turbocharger when working at very high temperature. The wear may lead to seizure of the parts. If desired, the wear washers may additionally form sealing means in order to prevent gas leakage from the turbocharger apparatus.

The turbocharger apparatus may be one in which the wear washers are prevented from rotation on the parts on which they are mounted, so that the wear washers rotate against each other in order to prevent wear of parts within the turbocharger apparatus. The wear washers are preferably made of a ceramic material. Other materials may however be employed.

The turbocharger apparatus may be one in which the sealing system prevents gas leakage past the wear washers.

BRIEF DESCRIPTION OF THE DRAWINGS

Embodiments of the invention will now be described solely by way of example and with reference to the accompanying drawings in which.

DETAILED DESCRIPTION OF THE PREFERRED EMBODIMENTS

Figure 1:
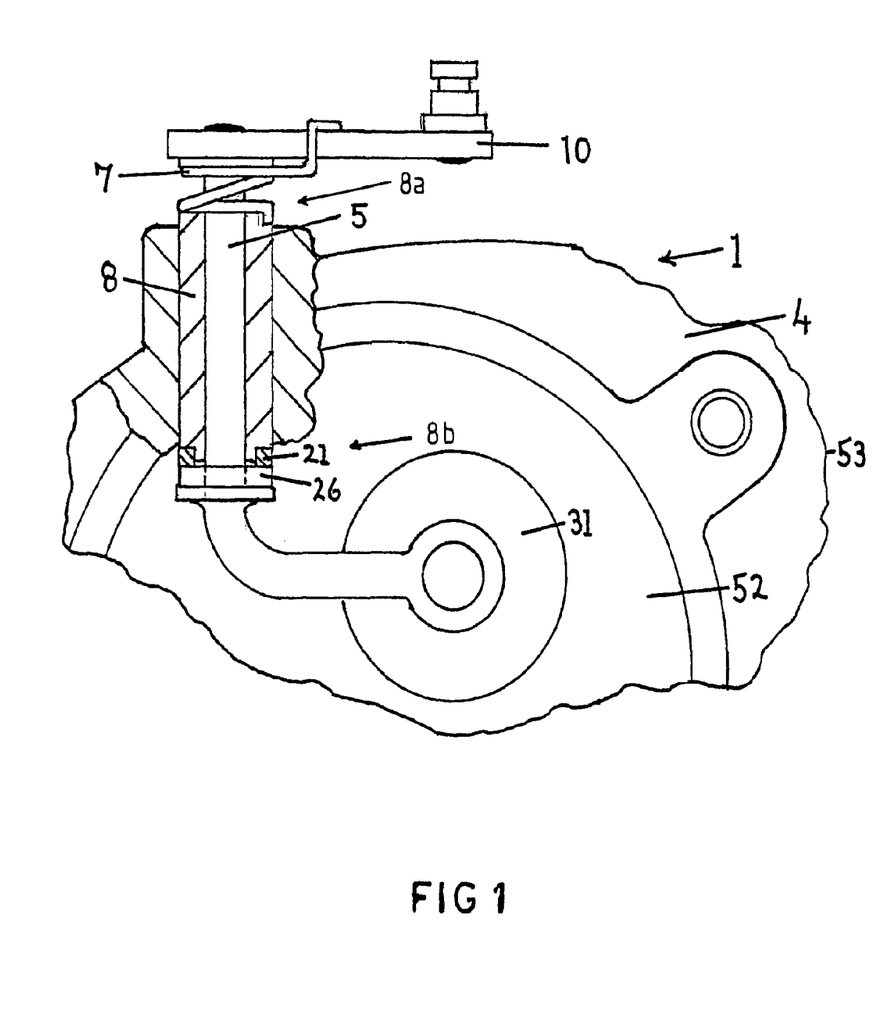
FIG. 1 is a part section of turbocharger apparatus showing part of a turbine housing with an exhaust gas sealing system.
Figure 2:
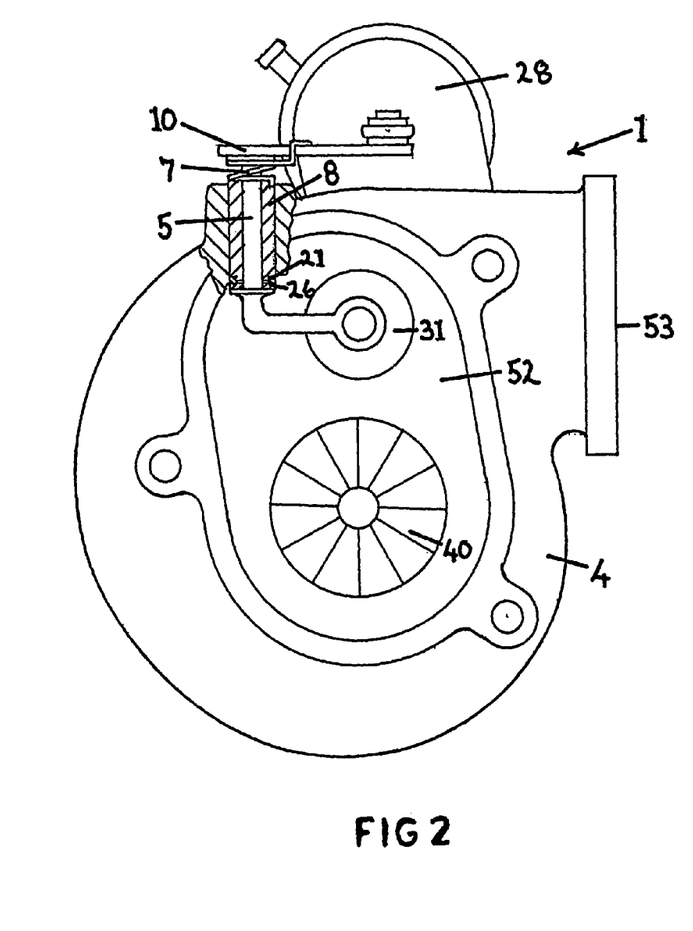
FIG. 2 shows a turbine housing assembly with a control assembly for a waste gated type of turbocharger with the exhaust gas sealing system.

Referring to FIGS. 1 and 2, there is shown waste gated turbocharger apparatus 1 comprising a turbine housing 4 with a control rod 5 in a bush 8, and a spring 7 between the bush 8 and a control lever 10. The bush 8 has a first end 8a and a second end 8b. As can be seen, the bush 8 comprises a solid cylindrical portion. and a bore which extends through the solid cylindrical portion and which is defined by an inner surface of the solid cylindrical portion. the Inner surface being in direct contact with the control rod 5.

Also shown are wear washers 21 and 26 and waste gate 31. FIG. 2 also shows an actuator control 28, a turbine 40, an exhaust exit chamber 52, and second inlet 53.

When exhaust gas enters through the second inlet 53 into the volute in the turbine housing 4, the exhaust gases rotate the turbine wheel 40. The turbine wheel speed is controlled by opening the waste gate 31. This is done by rotating the control rod 5 by movement from control lever 10. The exhaust gases then bypass the turbine 40. The gases that have passed through the turbine wheel 40 and the waste gate 31 enter into the exit chamber 52 where they are forced into the exhaust system. The sealing system prevents exhaust gases from leaking from the turbocharger apparatus and has been designed so exhaust gases do not leak past the bush 8 so all of the exhaust gases may be treated by the exhaust after-treatment system. It must be remembered that the temperature of the turbine housing 4 can be over 1000° C and so the design has to work when the parts have expanded due to high temperature, and prevent gas leakage, and control the wear of moving parts. This has been done by pulling a spring load between the control rod 5 and the bush 8 the second end 8b of the bush 8 and control rod 5 may be sealed. The spring 7 is mounted on the outside of the turbocharger apparatus 1 in order to prevent heat soak to spring 7. Where washers 21, 26 have been positioned between the control rod 5 and bush 8. These wear washers may be made of a material which can withstand very high temperature, and have low wear rates and corrosion resistance, such as ceramics. One problem with these materials is that the expansion rates are sometimes different from the materials that are used within other parts of the turbocharger, and so the design has to allow for different expansion rates in order to prevent gas leakage. The wear washers should be prevented from rotation on the parts that they are mounted on. In order to solve this problem, a square hole may be used in the bore of the wear washers. This locates on a square section of the bush 8 and on the control rod 5. The spring 7 compensates for wear and different expansion rates in the system, as well as preventing exhaust gas leakage.

Figure 3:
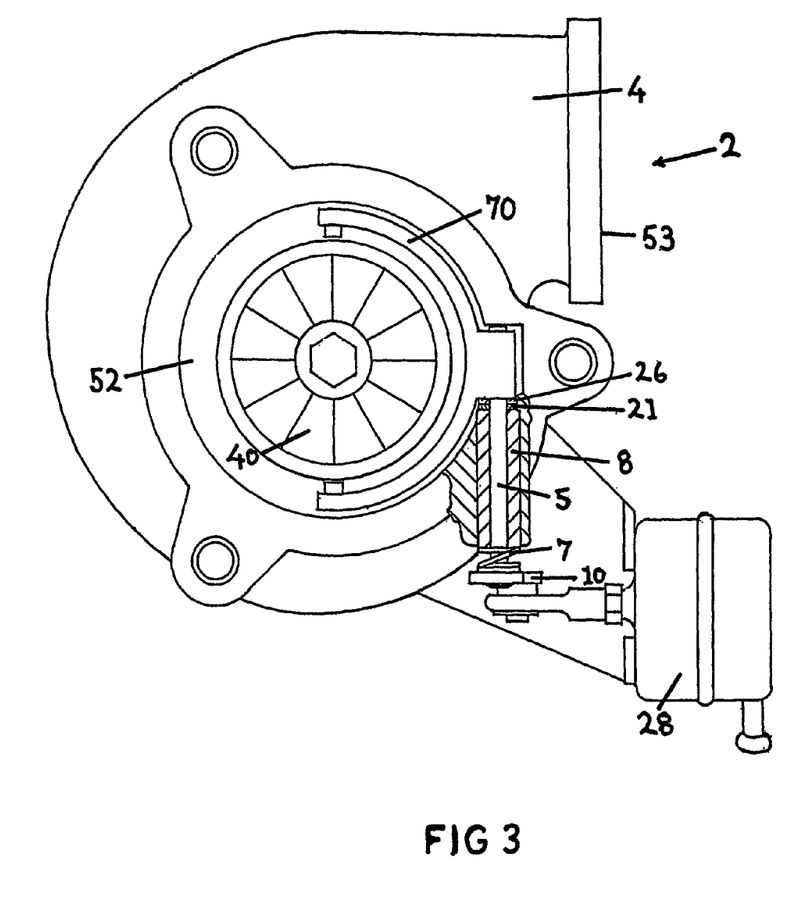
FIG. 3 shows a turbine housing assembly with a control assembly of a sliding piston type of turbocharger, with the exhaust gas sealing system.
Figure 4:
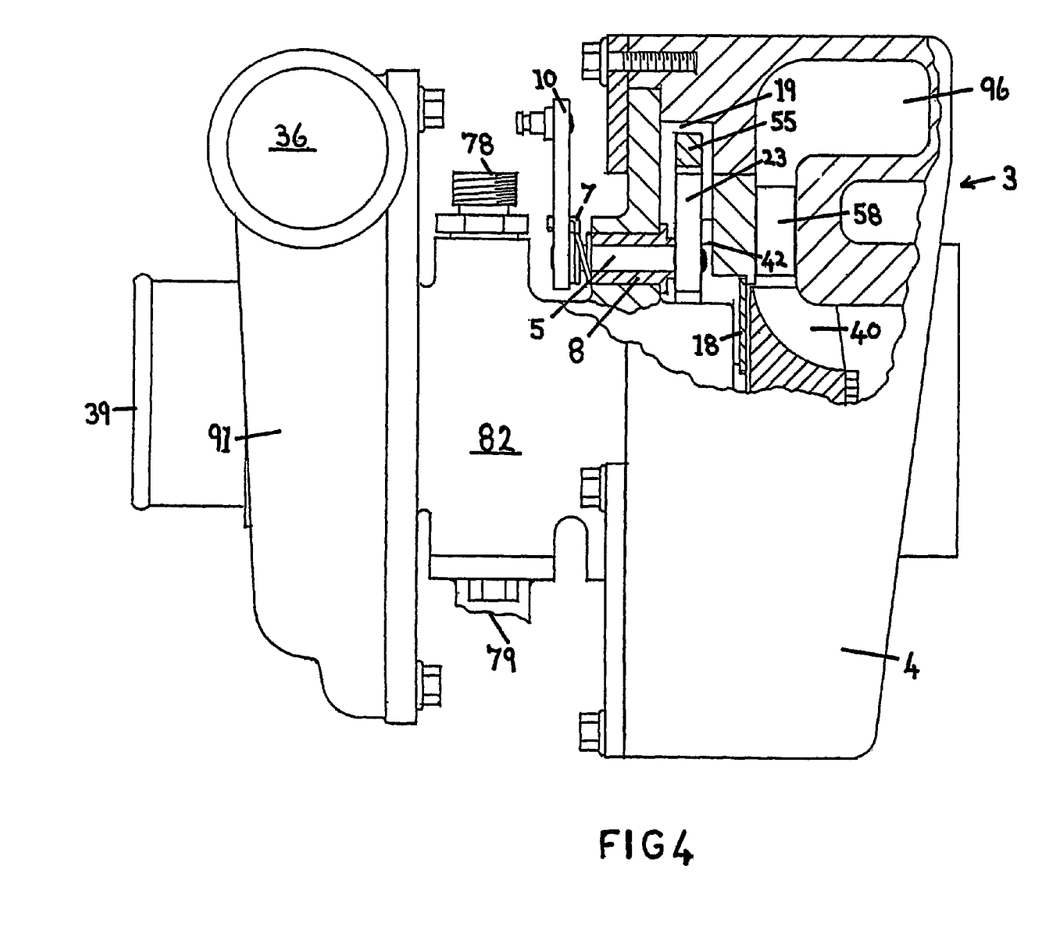
FIG. 4 shows a variable nozzle turbine (VNT) type turbocharger assembly with the exhaust gas sealing system.

In FIG. 3, the wear washers 21, 26 also prevent wear on a fork 70 and a bush 8. In FIG. 4 the wear washers 21, 26 also prevent wear on a lever 23 and the bush 8. When the control rod 5 rotates, the control rod only has to rotate up to about 20° so when a coil spring is used this movement is taken up in the coil of the spring so the spring does not rotate.

Referring now to FIG. 3-8, there is shown in FIG. 3 a variable turbocharger apparatus 2 of a sliding piston design whereby the piston (not shown) slides over the turbine wheel 40 in order to control the speed of the turbine wheel 40. A fork 70 may be used to move the piston. FIG. 3 shows that the same type of sealing system as in FIG. 1 may be used with this type of variable turbocharger design.

FIG. 4 shows VNT type variable turbocharger apparatus 3 whereby exhaust gases are prevented from leaking from the turbocharger apparatus.

FIG. 4 shows VNT type turbocharger apparatus 3 with a first inlet 39, an outlet 36 in a compressor housing 91, a bearing assembly 82, a oil inlet 78, and an oil outlet 79. Also shown are a turbine housing 4, a turbine 40, a control lever 10, a control rod 5, bush 8, a spring 7, and an inner control lever 23, with control ring 55, and vanes 58, with volute 96, and a sealing plate 18.

When the exhaust gases pass through the volute 96 of the turbine housing 4 of the VNT turbocharger apparatus 3, the gases pass over the vanes 58 that are mounted within the turbine housing 4. These vanes 58 rotate to control the gas flow to the turbine 40. This in turn controls the speed of the turbine 40.

The control of the vanes is by movement of the control lever 10. This rotates the control rod 5 in the bush 8 to position the inner control lever 23. The inner control level 23 is mounted in a slot in the control ring 55 which rotates when movement is applied to the inner control lever 23. This in turn moves a lever (not shown) that is mounted on the end of the vane shaft 42. This rotates the vanes 58.

Figure 5:
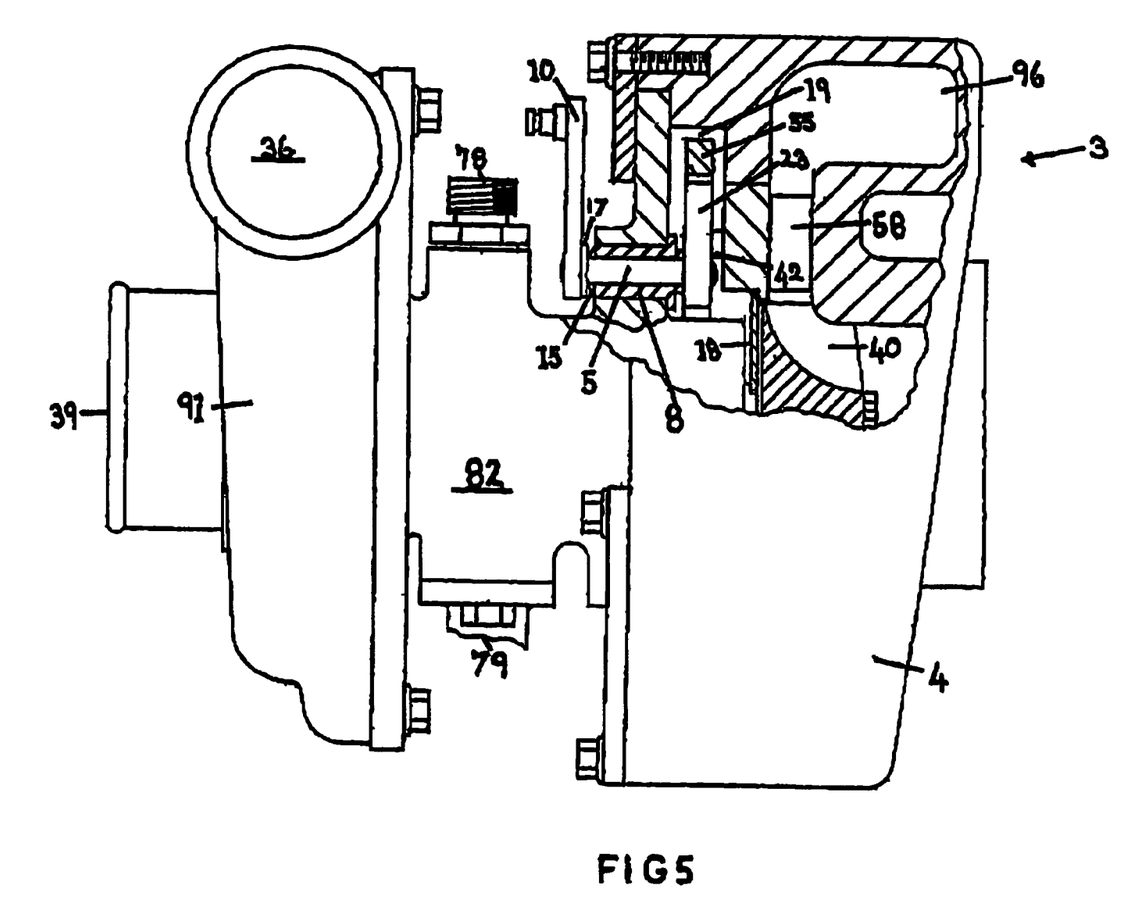
FIG. 5 shows a VNT type turbocharger assembly with the exhaust gas sealing system using a different spring design.

The volute chamber 96 is sealed in order to try and prevent gas leakage from the turbocharger apparatus as can be seen with seal plate 18. However, one of the problems with the VNT type turbocharger apparatus is exhaust gas leakage past the vanes along the vane shaft 42 into chamber 19. This allows exhaust gas leakage from the turbocharger apparatus. In order to prevent this leakage, the same type of seal design as shown in the turbocharger apparatus of FIG. 1 and the turbocharger apparatus 2 of FIG. 3 may be used. FIG. 5 shows VNT type turbocharger apparatus as shown in FIG. 4, with the same numbers as shown In FIG. 4. except where the turbocharger apparatus In FIG. 4 uses a coil-type spring 7, the spring in FIG. 5 is a disc spring 15. This type of spring helps prevent leakage. More specifically, the disc spring 15 has an inner concave area which, when the disc spring 15 is put under load, enables exhaust gas sealing at the first end 8a of the bush 8 by preventing exhaust gas leakage past the Inner concave area. This Inner concave area is shown in FIG. 5. The disc spring 15 abuts against abutment means 17 which provides a continuous uninterrupted surface through which the exhaust gases cannot pass under all working conditions of the turbocharger apparatus 3.

Figure 6:
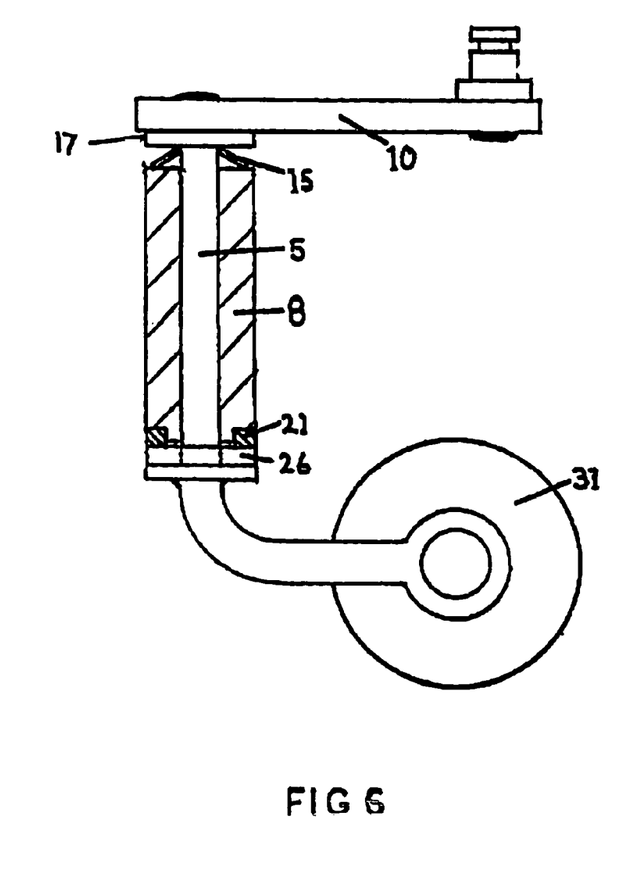
FIG. 6 shows sealing system with disc spring system and wear washers.

FIG. 6 shows a sealing system using the disc spring 15.

Figure 7:
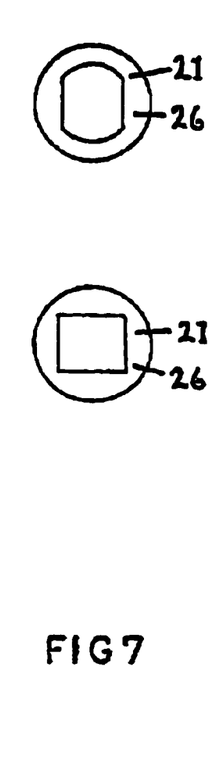
FIG. 7 shows wear washers with retaining holes to prevent rotation of the wear washers.

FIG. 7 shows two different alternative designs for the wear washers 21 and 26. These may be used in the sealing system. The square hole in one design and the slot in the other design are set into the bore of the wear washers so to prevent rotation of the wear washers when they are mounted on the control rod 5 and/or the bush 8.

Figure 8:
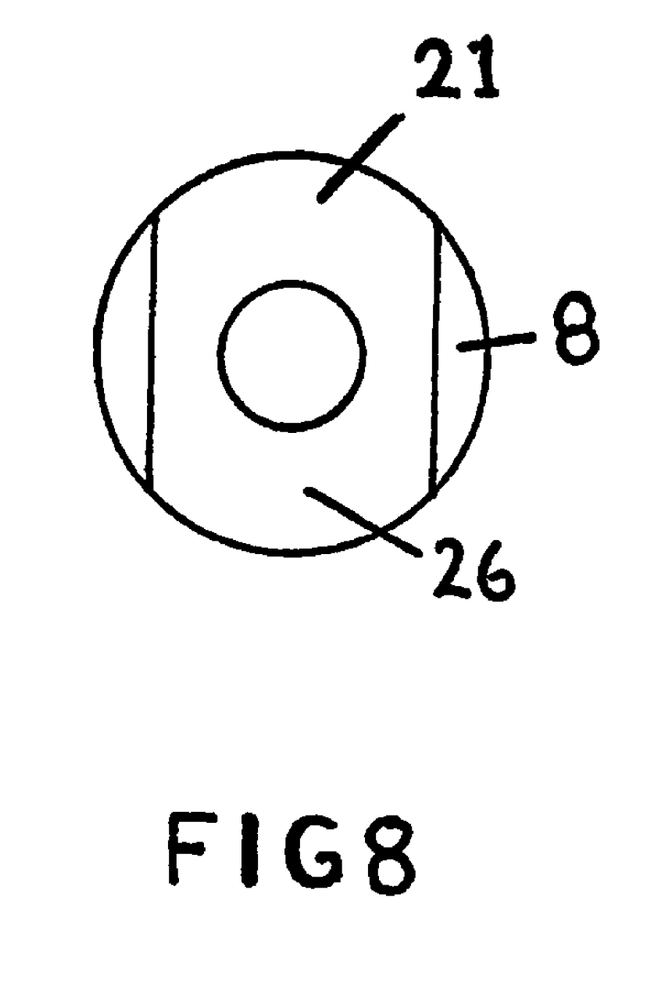
FIG. 8 shows wear washers of a different design to the designs shown in FIG. 7.

FIG. 8 shows a third design for the wear washers 21, 26 where the wear washer is located in a slot to prevent rotation.

Figure 9:
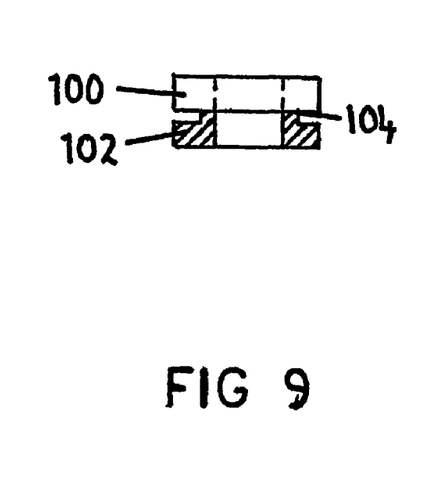
FIG. 9 is a section through a pair of wear washers.
Figure 10:
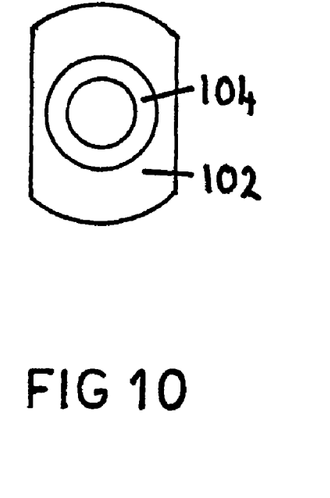
FIG. 10 is a top view of the lowermost wear washer shown in FIG. 9.

Referring to FIGS. 9 and 10, there are shown two wear washers 100, 102. The wear washer 102 has a reduced diameter portion 104. The reduced diameter portion 104 engages the wear washer 100 and gives less friction between the two wear washers 100, 102 than would be the case if the entire adjacent surface of the wear washer 102 engaged the adjacent surface of the wear washer 100.

Figure 11:
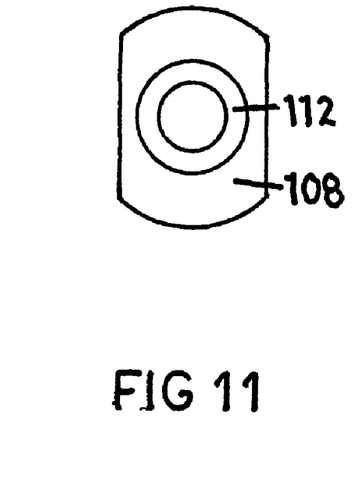
FIG. 11 is a cross-section like FIG. 9 but shows a further design of wear washers.
Figure 12:
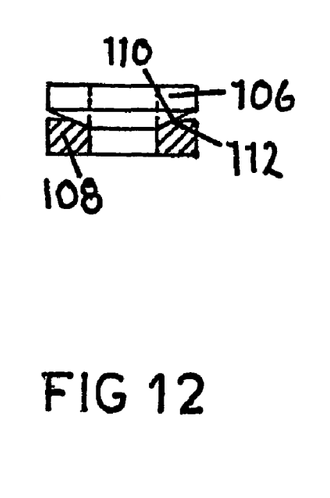
FIG. 12 is a top plan view of the lowermost wear washer shown in FIG. 11.

FIGS. 11 and 12 show two wear washers 106, 108 in which the wear washer 106 is provided with a chamfered portion 110. The wear washer 108 is provided with a complementary portion 112 which may be a chamfer or radius. Contact between the two portions 110, 112 may give a reduced frictional contact area than would be the case if the two wear washers 106, 108 engaged each other over their entire adjacent surfaces.

In FIGS. 1-12, a turbocharger sealing systems are shown for preventing exhaust gas leakage from turbocharger apparatus that can work under extreme temperature conditions, and the turbocharger sealing system is able to adjust for wear within the turbocharger apparatus.

It is to be appreciated that the embodiments of the invention described above with reference to the accompanying drawings have been given by way of example only and that modifications may be effected. Thus, for example, due to the location of the sealing system on the VNT turbocharger apparatus, where the sealing system is better protected from heat, the wear washers may be of a different design, e.g. only one wear washer may be used or the sealing may be done without wear washers.

The invention claimed is:

1. A turbocharger apparatus comprising: a
housing, a compressor mounted for rotation in the housing, a turbine mounted for rotation in the housing, a first inlet for enabling air to be conducted to the compressor, an outlet for enabling air from the compressor to be conducted to an engine, a second inlet for enabling exhaust gases from the engine to be conducted to the turbine in order to rotate the turbine, a chamber which surrounds the turbine and which receives the exhaust gases from the second inlet before the exhaust gases are conducted to the turbine, a bearing assembly for permitting the rotation of the turbine, and a control system for controlling the speed of the turbine; the control system comprising a fixed bush which has a first end and a second end, a control rod which is mounted in the bush, a control lever for rotating the control rod backwards and forwards, and an exhaust gas sealing system for preventing exhaust gas leakage from the turbocharger apparatus; the bush comprising a solid cylindrical portion, and a bore which extends through the solid cylindrical portion and which is defined by an inner surface of the solid cylindrical portion, the inner surface being in direct contact with the control rod; and the exhaust gas sealing system being such as to allow expansion of parts within the exhaust gas sealing system when the turbocharger apparatus is working at high temperatures, and the exhaust gas sealing system comprising a disc spring which:

(i) is mounted on the control rod at a position between the first end of the bush and the control lever;

(ii) causes a spring load to be applied to the second end of the bush and thereby exhaust gas sealing at the second end of the bush;

(iii) has an inner concave area which, when the disc spring is put under load, enables exhaust gas sealing at the first end of the bush by preventing exhaust gas leakage past the inner concave area; and (iv) is held in position on the control rod by abutment means which provides a continuous uninterrupted surface through which the exhaust gases cannot pass under all working conditions of the turbocharger apparatus.

2. The turbocharger according to claim 1 in which the disc spring adjusts for wear within the exhaust gas sealing system.

3. The turbocharger according to claim 2 in which the control rod is spring loaded such that the spring is mounted on the outside of the turbocharger apparatus in order to prevent heat soak to the spring.

4. The turbocharger according to claim 1 in which wear washers are used to prevent wear in the sealing system at high temperature.

5. The turbocharger according to claim 4 in which the wear washers form sealing means in order to prevent gas leakage from the turbocharger apparatus.

6. The turbocharger according to claim 4 in which the wear washers are prevented from rotation on parts on which they are mounted in order to allow the washers to work against each other and to prevent wear.

* * * * *